United States Patent [19]

Derbyshire

[11] 4,402,777

[45] Sep. 6, 1983

[54] SLEEVE AND COVERING FOR TUBING

[75] Inventor: Rodney L. Derbyshire, Northport, N.Y.

[73] Assignee: Radiation Dynamics, Inc., Melville, N.Y.

[21] Appl. No.: 287,669

[22] Filed: Jul. 28, 1981

Related U.S. Application Data

[63] Continuation of Ser. No. 197,857, Oct. 17, 1980, abandoned, which is a continuation of Ser. No. 38,067, May 11, 1979, abandoned.

[51] Int. Cl.³ ............... H01B 13/06; B65H 69/02; B32B 31/00
[52] U.S. Cl. .............................. 156/86; 156/53; 156/158; 156/295; 156/307.3; 428/913
[58] Field of Search .............. 156/86, 85, 187, 53, 156/165, 158, 213, 229, 294, 295, 307.3, 94, 49, 52; 264/230, 290.2, 288.4; 428/913; 285/381; 174/DIG. 8

[56] References Cited

U.S. PATENT DOCUMENTS

| | | | |
|---|---|---|---|
| 2,285,529 | 6/1942 | Papp | 156/49 |
| 3,080,892 | 3/1963 | Plummer | 156/52 |
| 3,526,682 | 9/1970 | Heslop et al. | 264/230 |
| 3,847,694 | 11/1974 | Stewing | 156/86 |
| 4,070,543 | 1/1978 | Thompson et al. | 156/49 |
| 4,190,485 | 2/1980 | Takeda et al. | 156/85 |

FOREIGN PATENT DOCUMENTS

| | | |
|---|---|---|
| 2438893 | 2/1976 | Fed. Rep. of Germany . |
| 2438829 | 3/1976 | Fed. Rep. of Germany . |
| 52-13800 | 2/1977 | Japan ............... 156/86 |

Primary Examiner—Edward C. Kimlin
Assistant Examiner—Louis Falasco
Attorney, Agent, or Firm—Howard L. Rose

[57] ABSTRACT

There is presented various methods and articles utilizing heat shrinkable and heat sealable sheets, films and materials.

2 Claims, 6 Drawing Figures

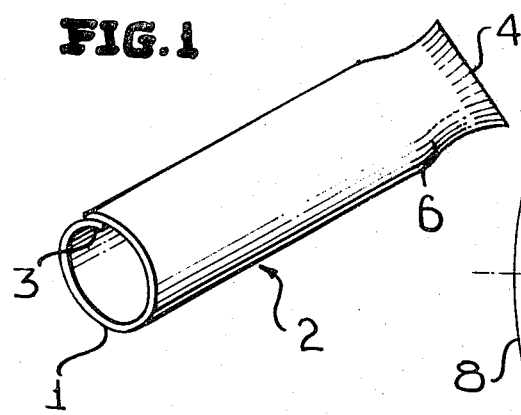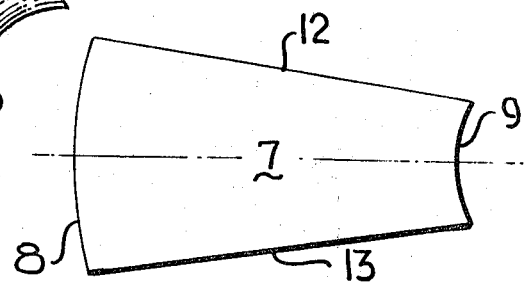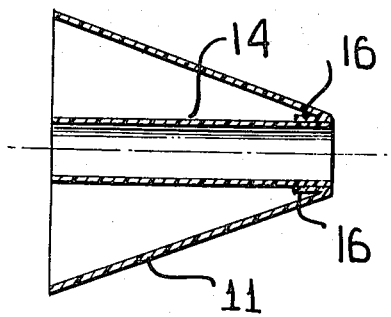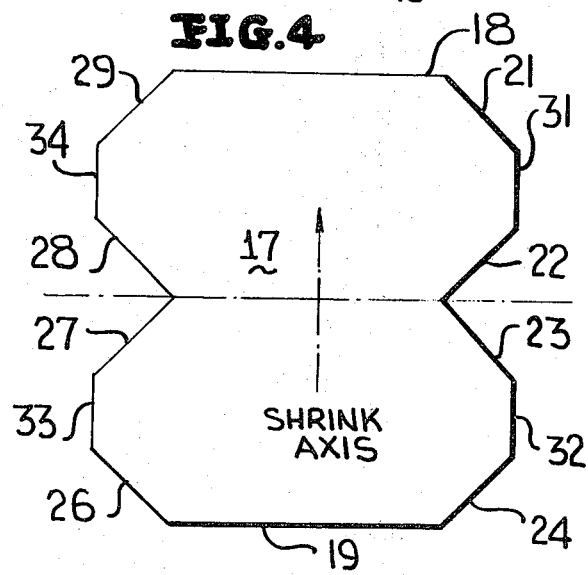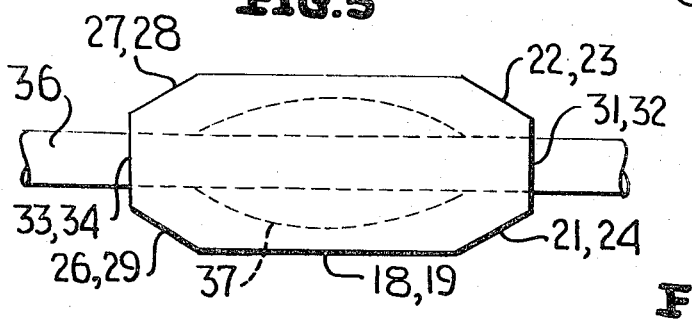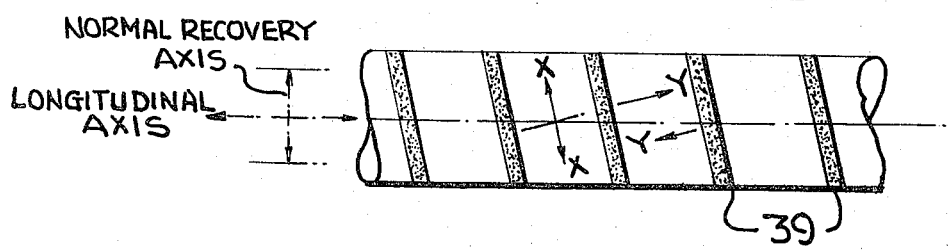

SLEEVE AND COVERING FOR TUBING

This is a continuation of application Ser. No. 197,857, filed Oct. 17, 1980 abandoned, which was a continuation of Ser. No. 038,067 filed May 11, 1979 abandoned.

RELATED APPLICATIONS

The present application is related to my co-pending applications Ser. No. 038,070, now U.S. Pat. No. 4,287,011 for Closure Method and Apparatus and Ser. No. 038,062, now U.S. Pat. No. 4,264,490 for a Composition of a Polyethylene and Isobutylene Copolymer of Anthony J. Berejka, both filed on concurrent date herewith.

TECHNICAL FIELD

The present invention relates to uses of and methods of use of materials which are both heat sealable and heat shrinkable and particularly to uses of cross-linked, non-melting, heat shrinkable, heat sealable materials which may be reheated to produce shrinkage without causing failure of the heat seal.

BACKGROUND ART

U.S. Pat. No. 3,899,807 Sovish et al discuss in detail various prior art approaches to the application of coverings to endless bodies or other difficult to cover shapes. In covering effectively endless electrical cables it has been a common practice to wrap a sheet of heat recoverable plastic about the cable mechanically join the edges of the sheet to form a sleeve and heat the sleeve to cause it to shrink down snuggly around the cable.

Sovish suggests differentially irradiating a plastic material so as to cross link the main body of the sheet to render it heat shrinkable while not irradiating the edges so as to render such heat sealable. Such an approach is cumbersome and uneconomical.

The term "heat sealable" refers to materials that may be bonded by heat generated by chemical and electrical action or mechanical action such as ultra-sonic heating.

The term "heat shrinkable" refers to any material that may be non-destructably reduced in size by heating. In general in the context in which employed in this application the term refers to a cross linked plastic which has been heated above its crystalline melt temperature, stretched and then cooled so as to retain its stretched dimensions. Thereafter upon heating above its crystalline melt temperature the sheet will recover approximately to its original size.

DISCLOSURE OF THE INVENTION

The present invention is related to two copending applications of the present invention filed on concurrent date herewith and assigned to the same assignee as the present invention.

In copending patent application Ser. No. 038,062, now U.S. Pat. No. 4,264,490 of Anthony J. Berejka there is disclosed a material which is both heat sealable and heat shrinkable. Basically the material is a cross-linkable polyethylene blended with a copolymer of isobutylene and a conjugated diene.

In my copending patent application Ser. No. 038,070, now U.S. Pat. No. 4,287,011 there is disclosed a type of seal which permits the edges of a sleeve wrapped about a body, to be joined, sealed to one another, with access required only to the outer or exposed side of the sleeve. The invention of this latter copending application may use the blend of the former copending application but such is not essential.

The present invention may employ the blend of the former copending application (hereinafter the "blend") to provide various novel enclosures for cables and various other shapes and configurations of bodies and to provide novel approaches to various fabrication processes.

In accordance with one aspect of the present invention an elongated body is wrapped with overlapping spirals of a sheet of the blended material, heat sealed along the overlapping edges and subjected to heat to cause shrinking about the object. In such an application, a material is employed that shrinks only along an axis parallel to the overlapping edges so that longitudinal shrinkage does not occur.

In accordance with other aspects of the invention various configurations are developed which accomodate various diverse shapes of bodies or which promote the spreading of mastic and related materials.

BRIEF DESCRIPTION OF THE DRAWINGS

FIG. 1 is a view in perspective of a sleeve fabricated in accordance with the present inventions.

FIG. 2 is a view of a blank for forming a truncated hollow conic for application to a cable or related article.

FIG. 3 is a cross-sectional view of a sleeve formed from the blank of 2 applied to a cable.

FIG. 4 is a view of another form of blank for application to a cable.

FIG. 5 is a view of a pouch formed from the blank of FIG. 4 applied about a splice on a cable.

BEST MODE FOR CARRYING OUT THE INVENTION

Various techniques are available for forming heat shrinkable plastic sheets. In one such system a Tenter frame is utilized. In such the edges of the sheet are held by a multitude of gripping fingers disposed along opposed edges of the sheet. The sheet is heated above its crystalline melt temperature and the fingers are slowly separated to stretch the sheet. Such separation may occur along mutually perpendicular axes with the same or different stretch factors depending upon the desired shrink characteristics of the final product. After stretching the material is cooled to below its crystalline melt temperature and released.

Other methods are stretching materials on a batch or continuous basis are available, for instance calendar rolls operating at different speeds at elevated temperatures. Further generally circular discs may be made radically shrinkable by pressing between two heated plates and cooling while expanded due to the pressure of the plates.

Referring more specifically to FIG. 1 of the accompanying drawings an example of a heat shrinkable, heat sealable product is illustrated.

A sheet of heat sealable, heat shrinkable material is formed into a cylindrical tube, generally designated by the reference numeral 2. A lap seal 3 is formed by overlapping the opposite edges of the sheet and heat sealing one edge to the other. The material is heat shrinkable only in the circumferential dimension.

An end cap 4 can be formed on the end of the tube by flattening the end, and heat sealing the edges to one another.

The closed end cylinder may then be placed about an object, for instance the end of a cable, and heated above its crystalline melt temperature to cause it to shrink down around the cable, tightly gripping it to produce a good seal. Shrinkage does not occur in the axial direction.

If it is desired to adhesively bond the sleeve to the enclosed body the arrangement of FIGS. 2 and 3 may be employed. In this arrangement a flat truncated cone 7 is provided with arcuate concentric ends 8 and 9. The sheet is formed into a hollow truncated cone by overlapping and sealing to one another outwardly diverging walls 12 and 13 of the sheet 7.

The cone 11 may now be placed, FIG. 3, over a cylindrical member 14 to which the tube is to be bonded. Before placing the cone over the member, mastic or other flowable sealant may be applied to the cylindrical member 14 and/or the interior surface of the conic. When the conic is subjected to heat to produce shrinking, the conic progressively collapses down around the cylindrical member spreading the mastic to the left as viewed in FIG. 3 and coating all surfaces progressively.

The above arrangement assures also that the forces applied at the right end of the member 14 are greater than at the left end, if the sheet from which blank or sheet 7 is cut is uniformly stretched. Such an arrangement is useful in the spreading process.

The arrangement of FIGS. 2 and 3 may be also employed where progressively uniformly increasing or decreasing radial forces are desired. If a constant force is desired then the sheet 7 of FIG. 2, rather than being cut as a conic from a uniformly stretched sheet may be formed by stretching a sheet nonuniformly to achieve the shape of sheet 7. In such case shrinkage of the member 7 back to its original shape about the member 14 would produce a generally uniform distribution of radial forces along the length of the member 14.

Referring now to FIGS. 4 and 5, a sheet 17 is provided which in general comprises two elongated octagons having an elongated side in common. Thus, the sheet 17 has two elongated sides 18 and 19, eight angled sides 21-24 and 26-29 and four straight sides 31-34. The sides 18, 21, 22, 28, 29, 31 and 34 together with the common side form one octagen and the remaining sides form the second octagen.

The length of each of the members 31-34 is slightly larger than one-half the diameter of a cable or pipe 36 about which the sheet is to be folded.

The sheet is folded along its common octagonal side about the cable 36 so as to cover a splice 37 therein. The edges 18 and 19 are sealed to one another as are the edges 21-24, 22-23, 26-29, and 27-28, thereby forming a pouch about the splice 37. For added strength and to prevent shifting of this pouch the common octagonal edge is also heat sealed to provide a width of seal equal to the seals at the other edges.

The entire assembly may now be heated to produce shrinkabe about the splice 37 and the cable 36.

For ease of use in the field of the pouch of FIG. 5, edges 22-23, 27-28 and if desired the common side may be sealed to provide a partially completed pouch. Then after the device is slipped over the splice in the field only three edges require sealing to complete the pouch.

It will be noted that the edges 22-23, 21-23, 26-29 and 27-28 provide conic shapes as in FIG. 3 so that the shrinking process may be utilized to spread mastic if such is used.

In each of the above embodiments of the invention, the combined lap and peel seals of my concurrently filed copending application Ser. No. 038,070, now U.S. Pat. No. 4,287,011 may be employed and in many instances where access is available only to the outside of a sleeve or covering is preferably employed.

Referring now specifically to FIG. 6 of the accompanying drawings the present invention is applied to spiral wrapped tubes. Spiral wrapped tubes of paper and steel are long established articles of commerce. Articles of virtually any diameter can be produced from an appropriate width of continuous sheet. For instance, spiral wrapped tapes are commonly utilized as wrappings or protective coatings on pipelines.

In accordance with the present invention a heat shrinkable plastic or elastomeric article fabricated from heat recoverable, heat sealable sheet 38 may be fabricated by heat sealing overlapping edges 39 of a spiral winding of the sheet. The original sheet would be shrinkable only along or substantially along its length so that where wrapped shrinkage occurs substantially circumferentially. For this application then it may be desirable for some longitudinal growth in the Y-axis of FIg. 6 as well as a reasonably high percent of shrinkage in the X-axis to provide good circumferential shrinkage, and to exert a radial force. The heat applied to accomplish the heat shrinkable action of a preformed tube does not destroy bonds at edge 39. This heat of recovery may be applied externally by a torch or other common method. It may be applied from the interior by pre- or post heating the pipe or tubular shape upon which the sleeve is being recovered.

Inasmuch as the present invention is subject to many variations, modifications and changes in detail, it is intended that all subject matter discussed above or shown in the accompanying drawings be interpreted as illustrative and not in a limiting sense.

What is claimed is:

1. A method of wrapping and sealing an elongated item in a covering material, the steps comprising
    forming a film of said covering material into a hollow truncated conical member whose end openings are larger than the cross-sectional dimension of the item to be covered, said conical member when so formed comprising a heat shrinkable, heat sealable material,
    said hollow truncated conical member being formed by (a) providing a flat truncated cone having two arcuate concentric ends between which are disposed two divergent side edges, (b) overlapping the side edges of said flat truncated cone, and (c) heat sealing the overlapped edges thereby to form said hollow truncated conical member,
    said flat truncated cone being cut from a uniformly stretched sheet thereby to provide a greater force at the smaller diameters than at larger diameters during heat shrinking,
    locating said elongated item within said conical member such that the longitudinal axis of said item and conical member are substantially concentric,
    applying a flowable sealant material between the conical member and said elongated item,
    heat shrinking the conical member such that the smaller diameters of the truncated cone contact the elongated item first progressively spreading the sealant material toward the direction of the larger diameters of the truncated cone along the surface of said elongated item, thereby to progressively seal the covering material to the elongated item.

2. A method of wrapping and sealing an elongated item in a covering material, the steps comprising forming a film of said covering material into a hollow truncated conical member whose end openings are larger than the cross-sectional dimension of the item to be covered, said conical member when so formed comprising a heat shrinkable, heat sealable material, said hollow truncated conical member being formed by (a) providing a flat truncated cone having two arcuate concentric ends between which are disposed two divergent side edges, (b) overlapping the side edges of said flat truncated cone, and (c) heat sealing the overlapped edges thereby to form said hollow truncated conical member, said flat truncated cone being formed by stretching a piece of unstretched material nonuniformly to achieve the shape of a flat truncated cone such that upon heat shrinkage of the covering, there being produced a generally uniform distribution of radial forces along the length of the elongated item, locating said elongated item within said conical member such that the longitudinal axis of said item and conical member are substantially concentric, applying a flowable sealant material between the conical member and said elongated item, heat shrinking the conical member such that the smaller diameters of the truncated cone contact the elongated item first progressively spreading the sealant material toward the direction of the larger diameters of the truncated cone along the surface of said elongated item, thereby to progressively seal the covering material to the elongated item.

* * * * *